(12) United States Patent
Ichikawa et al.

(10) Patent No.: US 10,531,547 B2
(45) Date of Patent: Jan. 7, 2020

(54) VEHICULAR LIGHTING DEVICE

(71) Applicant: Koito Manufacturing Co., Ltd., Tokyo (JP)

(72) Inventors: Tomoyuki Ichikawa, Shizuoka (JP); Masayasu Ito, Shizuoka (JP); Naoki Tatara, Shizuoka (JP); Satoshi Yamamura, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/713,744

(22) Filed: Sep. 25, 2017

(65) Prior Publication Data

US 2018/0014395 A1 Jan. 11, 2018

Related U.S. Application Data

(63) Continuation of application No. PCT/JP2016/056854, filed on Mar. 4, 2016.

(30) Foreign Application Priority Data

Mar. 26, 2015 (JP) ................... 2015-064377

(51) Int. Cl.
*H05B 37/02* (2006.01)
*F21S 41/00* (2018.01)
(Continued)

(52) U.S. Cl.
CPC .......... *H05B 37/0281* (2013.01); *B60Q 1/04* (2013.01); *B60Q 1/14* (2013.01); *B60Q 1/1407* (2013.01);
(Continued)

(58) Field of Classification Search
CPC ............ H05B 37/0281; H05B 33/0842; H05B 39/02; B60Q 1/1407; B60Q 1/18;
(Continued)

(56) References Cited

U.S. PATENT DOCUMENTS 7,237,928 B2 7/2007 Takeda et al.
8,575,840 B2 11/2013 Kanda et al.
(Continued)

FOREIGN PATENT DOCUMENTS

CN 101772438 A 7/2010
CN 102939500 A 2/2013
(Continued)

OTHER PUBLICATIONS

International Preliminary Report on Patentability for corresponding PCT application PCT/JP2016/056854, dated Sep. 26, 2017, ISA-JP.
(Continued)

*Primary Examiner* — Renan Luque
(74) *Attorney, Agent, or Firm* — Buchanan Ingersoll & Rooney PC

(57) ABSTRACT

A first light source illuminates a first region. A second light source is configured to provide lower luminance than that of the first light source. The second light source illuminates a second region that overlaps the first region, and that has a larger area than that of the first region. A lighting circuit drives the first light source and the second light source according to a common lighting instruction. The lighting circuit gradually turns on the first light source and the second light source with different gradual changing time periods in response to the lighting instruction.

11 Claims, 14 Drawing Sheets

(51) Int. Cl.
  *F21S 43/00* (2018.01)
  *B60Q 1/04* (2006.01)
  *B60Q 1/14* (2006.01)
  *B60Q 1/18* (2006.01)
  *H05B 33/08* (2006.01)
  *H05B 39/02* (2006.01)

(52) U.S. Cl.
  CPC ............... *B60Q 1/18* (2013.01); *F21S 41/00* (2018.01); *F21S 43/00* (2018.01); *H05B 33/0842* (2013.01); *B60Q 2300/052* (2013.01); *H05B 39/02* (2013.01)

(58) Field of Classification Search
  CPC ...... B60Q 1/14; B60Q 1/04; B60Q 2300/052; B60Q 1/085; B60Q 1/1423; B60Q 1/143; B60Q 2300/056; B60Q 2300/112; B60Q 2300/114; B60Q 2300/122; B60Q 2300/134; B60Q 2300/21; B60Q 2300/312; B60Q 2300/314; B60Q 2300/322; B60Q 2300/324; B60Q 2300/332; B60Q 2300/3321; B60Q 2300/333; B60Q 2300/334; B60Q 2300/335; B60Q 2300/336; B60Q 2300/41; B60Q 2300/42; B60Q 2300/45; B60Q 2400/30; F21S 41/00; F21S 43/00; G06K 9/00791; G06K 9/00825; G06K 9/2027; G08G 1/162; H01L 2224/48091; H01L 2924/00014
  See application file for complete search history.

(56) References Cited

U.S. PATENT DOCUMENTS

| | | | |
|---|---|---|---|
| 9,167,658 B2 | 10/2015 | Nakajo et al. | |
| 9,702,519 B2 | 7/2017 | Reiners | |
| 2003/0107323 A1* | 6/2003 | Stam | B60Q 1/10 315/82 |
| 2003/0142449 A1* | 7/2003 | Iwata | H02H 1/0015 361/58 |
| 2005/0083626 A1* | 4/2005 | Bruwer | H01H 13/063 361/93.1 |
| 2005/0134483 A1* | 6/2005 | Monji | B60Q 1/085 340/933 |
| 2006/0133103 A1* | 6/2006 | Muhlbaier | B60Q 1/2607 362/545 |
| 2007/0002571 A1* | 1/2007 | Cejnek | B60Q 1/12 362/460 |
| 2007/0132602 A1* | 6/2007 | Ito | B60Q 11/00 340/641 |
| 2008/0121761 A1* | 5/2008 | Telefont | B61L 5/1881 246/473.3 |
| 2011/0181197 A1* | 7/2011 | Kanda | B60Q 1/38 315/268 |
| 2012/0074845 A1* | 3/2012 | Aoki | H05B 33/0845 315/119 |
| 2013/0058114 A1 | 3/2013 | Reiners | |
| 2013/0088172 A1* | 4/2013 | Kikuchi | H05B 33/0815 315/307 |
| 2013/0127612 A1* | 5/2013 | Stadler | B60Q 1/34 340/465 |
| 2013/0320850 A1* | 12/2013 | Nakamura | F21S 41/663 315/186 |
| 2014/0001969 A1* | 1/2014 | Tateishi | H05B 33/0815 315/186 |
| 2014/0015407 A1 | 1/2014 | Baudru et al. | |
| 2014/0042325 A1* | 2/2014 | Yamamura | B60Q 1/0023 250/347 |
| 2014/0056012 A1* | 2/2014 | Yamazaki | B60Q 1/143 362/466 |
| 2014/0254188 A1 | 9/2014 | Masuda et al. | |
| 2015/0069908 A1* | 3/2015 | Fukui | H05B 33/0815 315/82 |
| 2016/0156152 A1* | 6/2016 | Ichikawa | H05B 33/0815 315/294 |
| 2016/0255692 A1* | 9/2016 | Ohira | H05B 33/0848 315/210 |
| 2016/0297351 A1* | 10/2016 | Ichikawa | B60Q 1/1407 |
| 2016/0348865 A1* | 12/2016 | Nakazawa | H01S 5/042 |

FOREIGN PATENT DOCUMENTS

| | | |
|---|---|---|
| CN | 102975652 A | 3/2013 |
| CN | 103458567 A | 12/2013 |
| CN | 103547006 A | 1/2014 |
| EP | 2567867 | 3/2013 |
| EP | 2670218 | 4/2013 |
| EP | 2685787 | 1/2014 |
| JP | 05-283172 A | 10/1993 |
| JP | 10-163555 A | 6/1998 |
| JP | 2001267669 A | 9/2001 |
| JP | 2005205950 A | 8/2005 |
| JP | 2005294166 A | 10/2005 |
| JP | 2007027720 A | 2/2007 |
| JP | 2013010491 A | 1/2013 |
| JP | 2014207780 A | 10/2014 |

OTHER PUBLICATIONS

International Written Opinion of ISA for corresponding PCT application PCT/JP2016/056854, dated May 31, 2016, ISA-JP.
Partial Supplementary European Search Report on corresponding EP Application No. 16768368.9, dated Sep. 28, 2018.
Extended European Search Report on corresponding EP application No. 16768368.9, dated Nov. 20, 2018.
First Office Action dated Feb. 15, 2019 in corresponding Chinese Patent Application No. 201680018436.0, and English translation thereof.

* cited by examiner

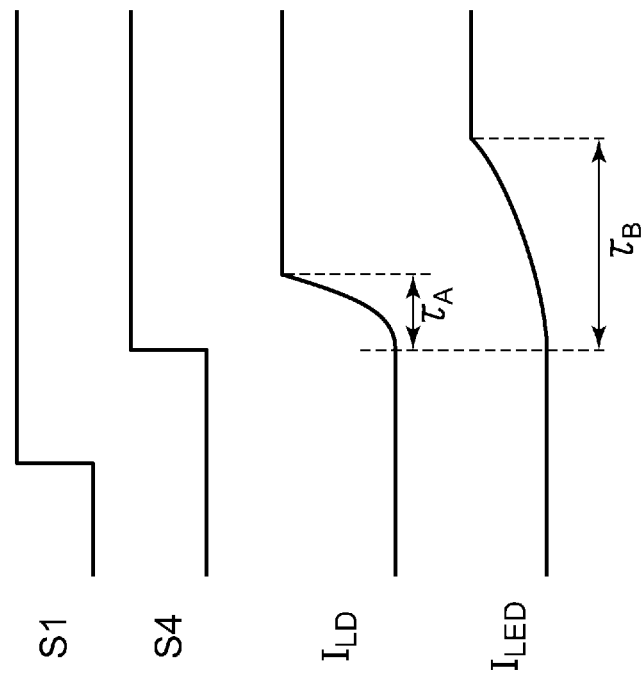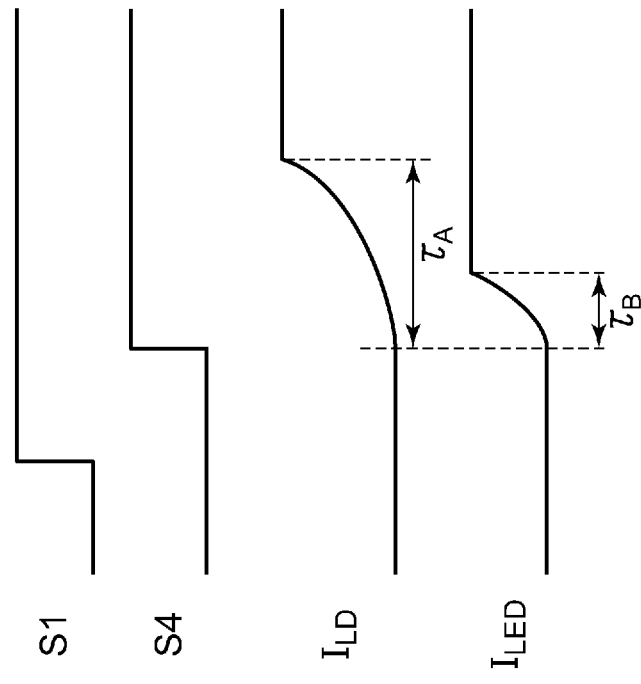

VEHICULAR LIGHTING DEVICE

BACKGROUND OF THE INVENTION

1. Field of the Invention

The present invention relates to a vehicular lighting device employed in an automobile or the like.

2. Description of the Related Art

With conventional techniques, as vehicular lighting devices, and particularly, as headlamp light sources, halogen lamps or HID (High Intensity Discharge) lamps have become mainstream. In recent years, as substitutions for such conventional lamps, the development of vehicular lighting devices employing a semiconductor light source such as an LED (light-emitting diode), laser diode (which will also be referred to as a "semiconductor laser"), or the like has been advancing.

A technique has been proposed in which multiple light sources emit light in an overlapping manner so as to form a desired light distribution pattern (Japanese Patent Application Laid Open No. 2005-294166). With conventional techniques, in a case in which a given region is illuminated by multiple light sources in an overlapping manner, the on/off operations of such multiple light sources are controlled at the same time based on a common lighting on/off instruction. It can be said that such an arrangement is preferable from the viewpoint of the simplicity of the control operation.

However, there is room for further improvement from the viewpoint of improving the appearance and the impression of high quality, from the viewpoint of improving the visibility of the forward area and the driver's comfort based on the improved visibility, and from the viewpoint of safety.

SUMMARY OF THE INVENTION

The present invention has been made in view of such a situation. Accordingly, it is an exemplary purpose of an embodiment of the present invention to provide a vehicular lighting device that presents an improved appearance and impression of high quality and/or provides improved visibility for the forward area.

An embodiment of the present invention relates to a vehicular lighting device. The vehicular lighting device comprises: a first light source structured to illuminate a first region; a second light source structured to provide a lower luminance than that of the first light source, and to illuminate a second region that overlaps the first region and has a larger area than that of the first region; and a lighting circuit structured to drive the first light source and the second light source according to a lighting instruction, and to gradually turn on the first light source and the second light source with different gradual change time periods in response to the lighting instruction.

With this embodiment, after the brightness of a given region is changed, the brightness of another region is changed with a time lag between them. This presents an improved appearance and feeling of high quality and/or provides improved visibility for the forward area as compared with an arrangement in which the brightness levels of these regions are changed at the same time.

Also, the gradual change time period set for the first light source may be longer than the gradual change time period set for the second light source.

With such an arrangement, after the wide region is illuminated beforehand in order to allow the driver to grasp the overall situation, the spot to which attention is to be directed along the driving axis is intensively illuminated, thereby facilitating driving the vehicle.

Also, the gradual change time period set for the second light source may be longer than the gradual change time period set for the first light source.

With such an arrangement, after the spot to which attention is to be directed along the driving axis is illuminated so as to direct the driver's attention, the surrounding region is illuminated over a wide area, thereby providing improved safety.

Also, the difference in the gradual change time period between the first light source and the second light source may be included in a range from 0.2 to 5 seconds.

In a case in which the time difference is excessively small, the effect is hard to recognize. Conversely, if the time difference is excessively large, a long time is required before sufficient brightness is obtained, and accordingly, a long time is required before securing visibility for the driver. This degrades the primary function of the vehicular lighting device. By designing the time difference in a range of 0.2 to 5 seconds, such an arrangement provides both the effect according to the present invention and the primary function of the vehicular lighting device.

Also, the first light source and the second light source may each be a light source for providing an additional high beam.

Also, the first light source may be structured as a laser diode. Also, the second light source may be structured as a light-emitting diode.

By employing a combination of two kinds of light sources having different characteristics, such an arrangement is capable of emitting light over a long distance by means of the laser diode having high directionality and of illuminating a wide region with high brightness by means of the light-emitting diode.

Also, the first light source and the second light source may be coupled in series. Also, the lighting circuit may comprise: a driving circuit structured to supply a driving current that corresponds to a dimming signal to a series connection circuit of the first light source and the second light source; a bypass switch arranged in parallel with one light source from among the first light source and the second light source set for a longer gradual change time period; and a gradual change controller structured to generate the dimming signal that corresponds to gradually turning on/off the other light source set for a shorter gradual change time period, and to control a state of the bypass switch so as to gradually turn on/off the aforementioned one light source.

This allows a common driving circuit to turn on the two light sources with different gradual change time periods. Thus, such an arrangement allows costs to be reduced as compared with an arrangement including a pair of driving circuits.

Also, the gradual change controller may comprise: a transistor structured as the bypass switch; a signal generating unit structured to generate a gradual change signal that indicates a waveform for gradually turning on the other light source; and an error amplifier structured to amplify a difference between a signal that indicates a driving current that flows through the other light source and the gradual change signal, and to output the difference thus amplified to a control terminal of the transistor.

Also, the gradual change controller may comprise: a transistor structured as the bypass switch; a signal generating unit structured to generate a gradual change signal that indicates a waveform for gradually turning on the other light source; and a pulse modulator structured to perform switching of the transistor according to the gradual change signal.

Another embodiment of the present invention also relates to a vehicular lighting device. The vehicular lighting device comprises: a light source comprising a laser diode; and a lighting circuit structured to supply a driving current to the laser diode. The lighting circuit is structured to be switchable between a normal mode in which a driving current that exceeds an oscillation threshold value is supplied to the laser diode and a test mode in which a driving current that is lower than the oscillation threshold value is steadily supplied to the laser diode.

During maintenance, the vehicle is stationary, and it can be assumed that there are workers around the vehicle. In this state, in a case in which the laser diode emits light in the same way as when the vehicle is driven, this disturbs the workers in the vicinity of the lighting device. Also, a malfunction can occur in the lighting device, and in such a case, it is conceivable that the output light of the laser diode would be directly emitted without being scattered.

With such an embodiment, in the maintenance mode, the laser diode emits very weak light without oscillation of the laser diode, thereby providing improved safety.

Also, the vehicular lighting device may further comprise a processor structured to receive a lighting on/off instruction for the light source from a vehicular ECU (Electronic Control Unit) via a bus. Also, the processor may be set to the test mode according to control received via the bus. In this case, after a maintenance tool is coupled to the vehicular ECU, such an arrangement is capable of transmitting an instruction to emit light in the test mode to the vehicular lighting device via the vehicular ECU.

Also, the light source may comprise a fluorescent member structured to be excited by an excitation light output from the laser diode and to emit a fluorescent light, in addition to the laser diode. Also, the light source may be structured to generate a white output light comprising a spectrum of the excitation light and the fluorescent light.

With such a light source, if a malfunction occurs in the fluorescent member, the output light of the laser diode is directly emitted without being scattered. Thus, this is a particularly effectively usage of such a light source.

Yet another embodiment of the present invention also relates to a vehicular lighting device. The vehicular lighting device comprises: a semiconductor light source; a driving circuit structured to supply, to the semiconductor light source, a driving current that corresponds to a dimming signal; a processor structured to generate a lighting on/off instruction signal that instructs the semiconductor light source to turn on and off according to an instruction from a vehicle and driving information that indicates a driving situation; a gradual change controller structured to generate the dimming signal that gradually changes with time in response to the lighting on/off instruction signal; and a switch arranged on a power supply path that extends from a battery to the driving circuit, and structured such that an on/off state thereof is controlled by the processor. When the laser diode is to be gradually turned off, the processor turns off the switch after a predetermined time period elapses after the lighting on/off instruction signal is set to the lighting off level.

This supports the gradual lighting off function. In addition, this prevents the semiconductor light source from being driven by an out-of-control current even if a short-circuit fault has occurred in the switching element on the current path of the driving circuit.

Also, when the semiconductor light source is to be instantly turned off, the processor may immediately turn off the switch.

Also, when the lighting on/off instruction signal is to be set to a lighting on level, the processor may turn on the switch at the same time as or otherwise before the setting of the lighting on/off instruction signal to the lighting on level.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A and 3B are operation waveform diagrams each showing the operation of the vehicular lighting device shown in FIG. 2;

DETAILED DESCRIPTION OF THE INVENTION

Figure 1A:
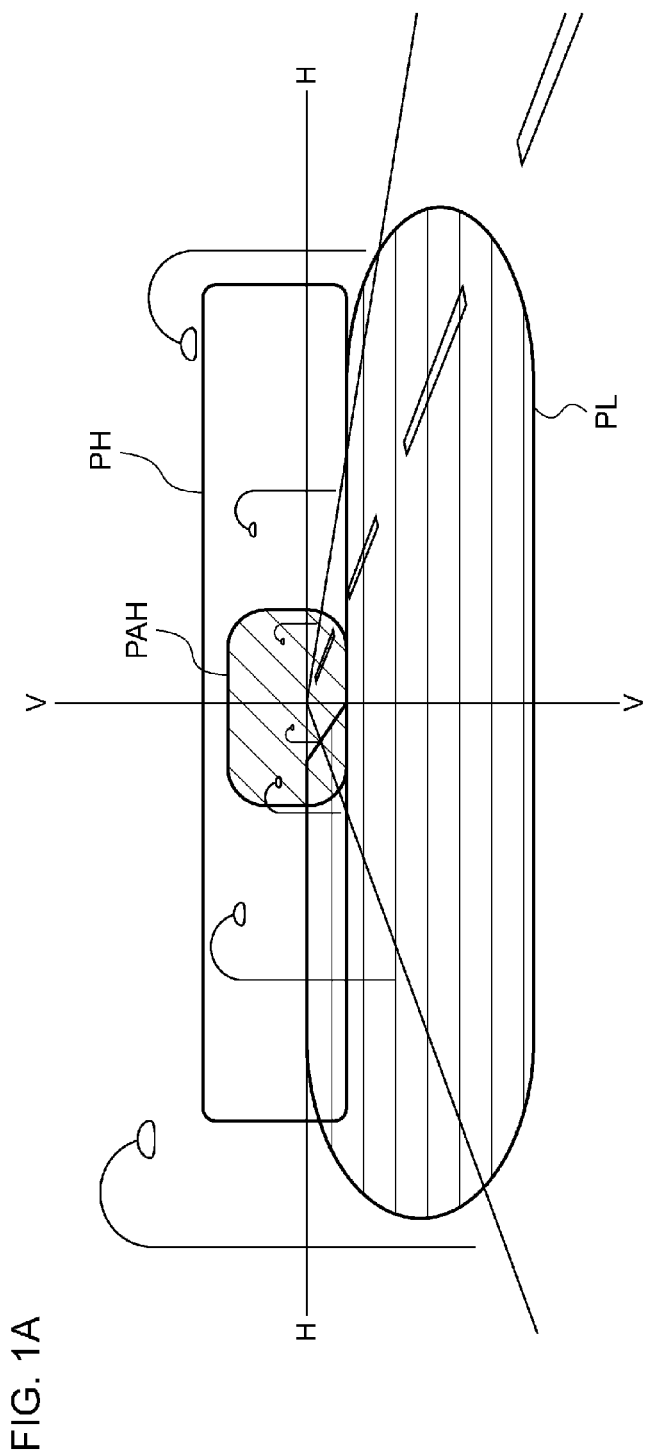
FIG. 1A is a diagram showing light distribution patterns in a low-beam mode and a high-beam mode formed on a virtual vertical screen arranged at a predetermined forward position of the lighting device.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection therebetween, or that does not damage the functions or effects of the connection therebetween, in addition to a state in which the member A is physically and directly coupled to the member B.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions or effects of the connection therebetween, in addition to a state in which the member A is directly coupled to the member C, or the member B is directly coupled to the member C.

First Embodiment

Figure 1B:
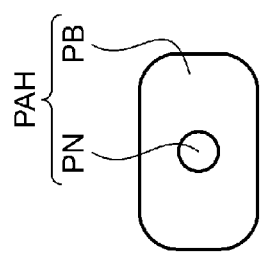
FIG. 1B is a diagram showing a light distribution pattern supported by the additional high-beam lamp.

FIG. 1A shows light distribution patterns in a low-beam mode and a high-beam mode formed on a virtual vertical screen arranged at a predetermined position forward of the lighting device. Here, "PL" indicates a region illuminated by a low-beam lamp, and "PH" indicates a region illuminated by an ordinary high-beam lamp. Furthermore, "PAH" indicates a region illuminated by an additional high-beam lamp that differs from the ordinary high-beam lamp, so as to illuminate a more distant region. FIG. 1B is a diagram showing a light distribution pattern PAH of the additional high-beam lamp. The light distribution pattern PAH of the additional high-beam lamp is formed by a first light source and a second light source. The first light source illuminates a first region PN defined as a central narrow region. The first light source is preferably configured as a laser diode having high directionality. The second light source illuminates a second region PB overlapping the first region PN and having an area that is larger than the first region PN. As the second light source, an LED is employed, for example.

Figure 2:
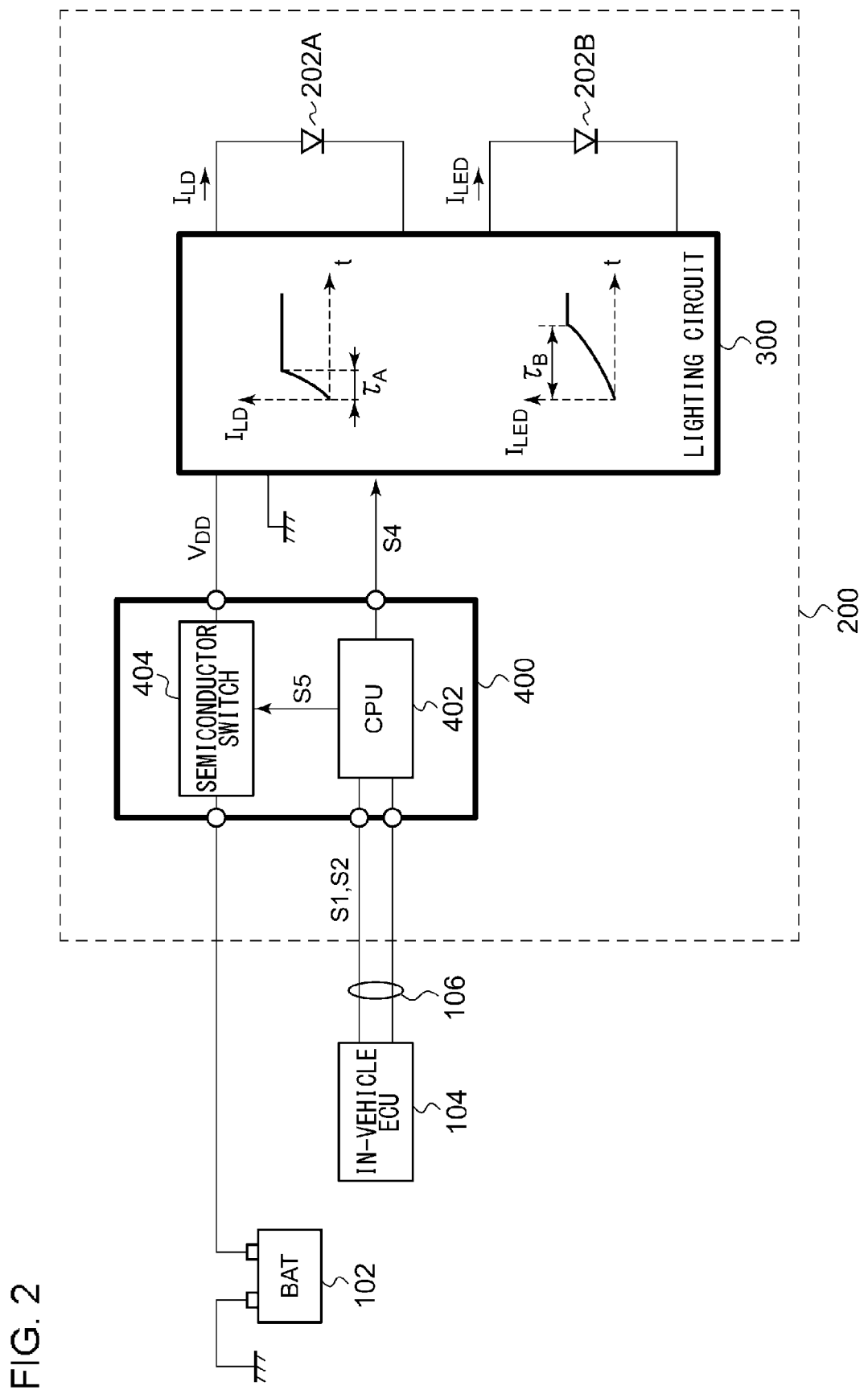
FIG. 2 is a block diagram showing a lighting device system including a vehicular lighting device according to a first embodiment.

FIG. 2 is a block diagram showing a lighting device system 100 including a vehicular lighting device 200 according to a first embodiment.

The vehicular lighting device 200 forms the additional high-beam distribution pattern shown in FIG. 1. In actuality, in addition to the additional high-beam lamp, the vehicular lighting device 200 further includes an ordinary high-beam lamp, a low-beam lamp, and a clearance lamp, which are not shown.

A vehicular ECU (electronic control unit) 104 is coupled to the vehicular lighting device 200 via a control line such as a CAN (controller area network) bus 106 or the like, and integrally controls the vehicular lighting device 200.

As viewed from the vehicular ECU 104, the additional high-beam lamp of the vehicular lighting device 200 is a single lamp. Accordingly, the vehicular ECU 104 generates a single lighting instruction S1 which instructs the additional high-beam lamp to turn on and off. In some cases, the lighting instruction S1 is also used as an instruction to turn on the high-beam lamp.

Furthermore, in addition to the lighting instruction S1, the vehicular ECU 104 transmits, to the vehicular lighting device 200, information (driving information) S2 which indicates a driving situation.

Next, description will be made regarding a configuration of the vehicular lighting device 200. The vehicular lighting device 200 includes a first light source 202A, a second light source 202B, a lighting circuit 300 for such light sources, and a lighting device ECU 400. The first light source 202A is configured as a laser diode. The second light source 202B is configured as an LED. In actuality, the lighting device system 100 is provided with a pair of left and right vehicular light sources. However, only one of the vehicular lighting devices 200 is shown.

The lighting circuit 300 drives the first light source 202A and the second light source 202B according to a lighting on/off instruction signal S4 received from the lighting device ECU 400. The lighting on/off instruction signal S4 is shared between the first light source 202A and the second light source 202B. The lighting circuit 300 is configured to turn on the first light source 202A and the second light source 202B with different gradual change time periods $\tau_A$ and $\tau_B$ according to the lighting on/off instruction signal S4.

When the lighting on/off instruction signal S4 transits to a lighting on level (e.g., high level), the lighting circuit 300 raises a driving current $I_{LD}$ to be supplied to the first light source 202A with a first transition time period (gradual change time period). Furthermore, when the lighting on/off instruction signal S4 transits to the lighting on level, the lighting circuit 300 raises a driving current $I_{LD}$ to be supplied to the second light source 202B with a second transition time period $\tau_B$ (gradual change time period). Detailed description thereof will be made later.

Human eyes have logarithmical sensitivity characteristics with respect to the surrounding brightness. Accordingly, as the surrounding brightness level becomes lower, the sensitivity of human eyes becomes higher. In the case of gradually raising the luminance of a lamp (gradually turning on), during a range in which the luminance of the lamp is low, the luminance is raised with a low rate of change. Subsequently, the rate of change in luminance is raised according to an increase in the luminance of the lamp. With such an arrangement, the lamp can be turned on in a manner that is natural for human eyes. Similarly, in a case of gradually lowering the luminance of the lamp (gradually turning off), during a range in which the luminance of the lamp is high, the luminance is lowered with a high rate of change. Subsequently, the rate of change in luminance is lowered according to a reduction in the luminance of the lamp.

The lighting device ECU 400 includes a CPU (central processing unit) 402 and a semiconductor switch 404. The CPU 402 generates the lighting on/off instruction signal S4 which instructs the additional high-beam light source 202 to turn on or off according to the lighting instruction S1 and the driving information S2 received from the vehicular ECU 104.

For example, the driving information S2 includes the presence or absence of a forward vehicle (S2a), the vehicle speed (S2b), and the steering angle (S2c). When the lighting instruction S1 is an instruction to turn on the lamp, and when the presence or absence of a forward vehicle, the vehicle speed, and the steering angle satisfy predetermined conditions, the lighting device ECU 400 sets the lighting on/off instruction signal S4 to the lighting on level.

As an example, when the lighting on/off instruction signal S4 is an instruction to turn on the lamp, and when the conditions (i) no forward vehicle is detected, (ii) the vehicle speed is equal to or higher than a predetermined value (80 km/h), and (iii) the steering angle is equal to or lower than a predetermined value (e.g., 5 degrees) are satisfied, the lighting on/off instruction signal S4 is set to the lighting on level.

Furthermore, when the lighting on/off instruction signal S4 is set to the lighting on level, and when at least one condition is satisfied from among (i) a forward vehicle is detected, (ii) the vehicle speed is equal to or lower than a predetermined value (60 km/h), and (iii) the steering angle is equal to or higher than a predetermined value (e.g., 10 degrees), the lighting on/off instruction signal S4 is set to the lighting off level.

The semiconductor switch 404 is arranged on a power supply path via which power is supplied from the battery 102 to a driving circuit 302. The on/off operation of the semiconductor switch 404 is controlled according to a control signal S5 received from the processor 402. In the lighting on state of the additional high-beam light source 202, the semiconductor switch 404 is turned on.

The above is the configuration of the lighting device system 100. Next, description will be made regarding the operation thereof.

FIGS. 3A and 3B are operation waveform diagrams each showing the operation of the vehicular lighting device 200 shown in FIG. 2.

FIG. 3A shows an example in which the first gradual change time period $\tau_A$ is longer than the second gradual change time period $\tau_B$. In this control operation, first, the LED illuminates a relatively wide range over a long distance. After the driver has grasped the overall situation, the laser diode gradually illuminates a spot to which attention is be directed along the driving axis, thereby facilitating driving the vehicle.

FIG. 3B shows an example in which the first gradual change time period $\tau_A$ is shorter than the second gradual change time period $\tau_B$. In this control operation, first, the spot to which attention is to be directed along the driving axis is illuminated. After directing the driver's attention to the spot, the surrounding region is illuminated over a wide range, thereby providing improved safety.

That is to say, with the vehicular lighting device 200, by providing a time difference in the change of the luminance between the two light sources, this provides improved visibility for a forward area as compared to an arrangement in which the luminance is changed at the same time for the two light sources. The control operation shown in FIG. 3A or 3B may be set for the vehicular lighting device 200 beforehand. Also, the CPU 402 may adaptively select the control operation.

In addition, this provides effects of improving the appearance and impression of high quality.

The difference between the first gradual change time period $\tau_A$ and the second gradual change time period $\tau_B$ is preferably set to a value on the order of 0.2 seconds to 5 seconds. Furthermore, each of the first gradual change time period $\tau_A$ and the second gradual change time period $\tau_B$ is preferably set to a value on the order of 0.2 seconds to 5 seconds.

In a case in which the time difference is excessively small, the effect is hard to recognize. Conversely, if the time difference is excessively large, a long time is required before sufficient brightness is obtained, and accordingly, a long time is required before securing visibility for the driver. This degrades the primary function of the vehicular lighting device. By designing the time difference in a range of 0.2 to 5 seconds, such an arrangement provides both the effect according to the present invention and the primary function of the vehicular lighting device.

Next, description will be made regarding example configurations of the lighting circuit 300.

First Example Configuration

Figure 4:
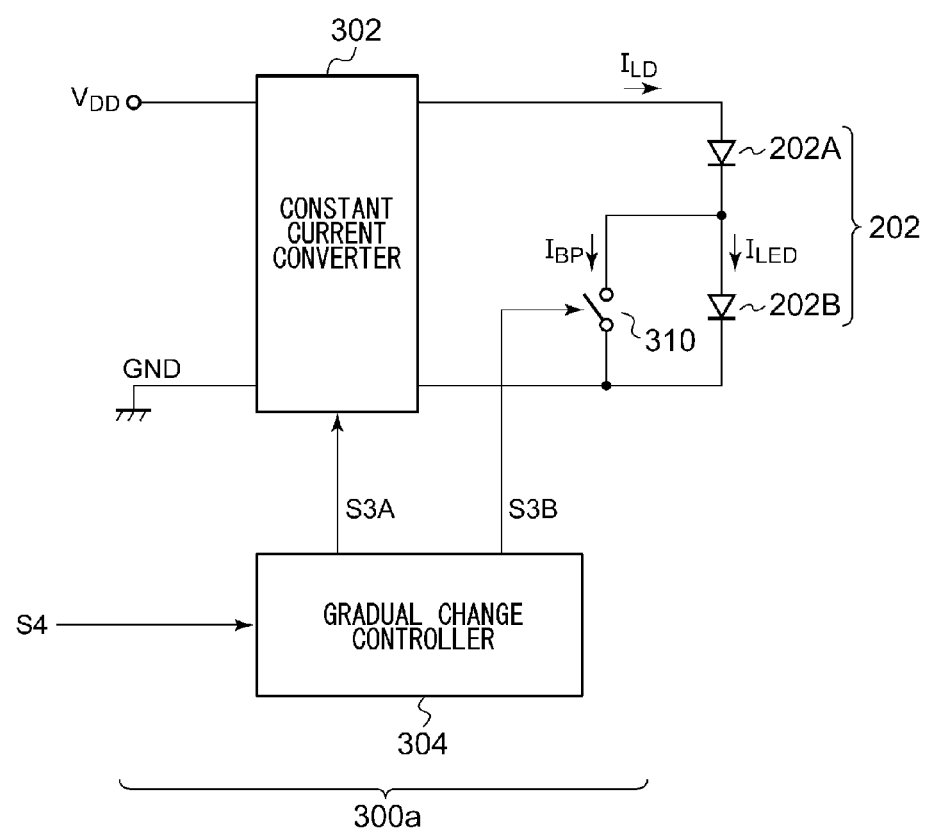
FIG. 4 is a block diagram showing a lighting circuit according to a first example configuration.

FIG. 4 is a block diagram showing a lighting circuit 300a according to a first example configuration. In this example, an arrangement in which $\tau_A < \tau_B$ will be described. The first light source 202A and the second light source 202B are coupled in series. The lighting circuit 300a includes a driving circuit 302, a gradual change controller 304, and a bypass switch 310. The driving circuit 302 supplies a driving current $I_{LD}$ that corresponds to a dimming signal S3A to a series connection circuit 202 comprising the first light source 202A and the second light source 202B.

The driving circuit 302 is preferably configured as a constant current converter that stabilizes the driving current $I_{LED}$ to a target current that corresponds to the dimming signal S3. It should be noted that the topology of the constant current converter is not restricted in particular. The driving circuit 302 may employ both an analog dimming operation in which the amount of the driving current $I_{LD}$ is adjusted and a PWM (pulse width modulation) dimming operation in which high-speed switching is performed for the driving current $I_{LD}$ so as to adjust the duty ratio thereof. Also, the driving circuit 302 may employ only one from among the analog dimming operation and the PWM dimming operation.

The bypass switch 310 may be configured as a transistor. The bypass switch 310 is arranged in parallel with the light source 202B, i.e., the light source to be provided with a longer gradual change time period from among the first light source 202A and the second light source 202B. The gradual change controller 304 generates the dimming signal S3A that corresponds to gradually turning on and off the light source 202A with a shorter gradual change time period. Furthermore, the gradual change controller 304 controls the state of the bypass switch 310 so as to gradually turn on and off the other light source 202B.

Figure 5:
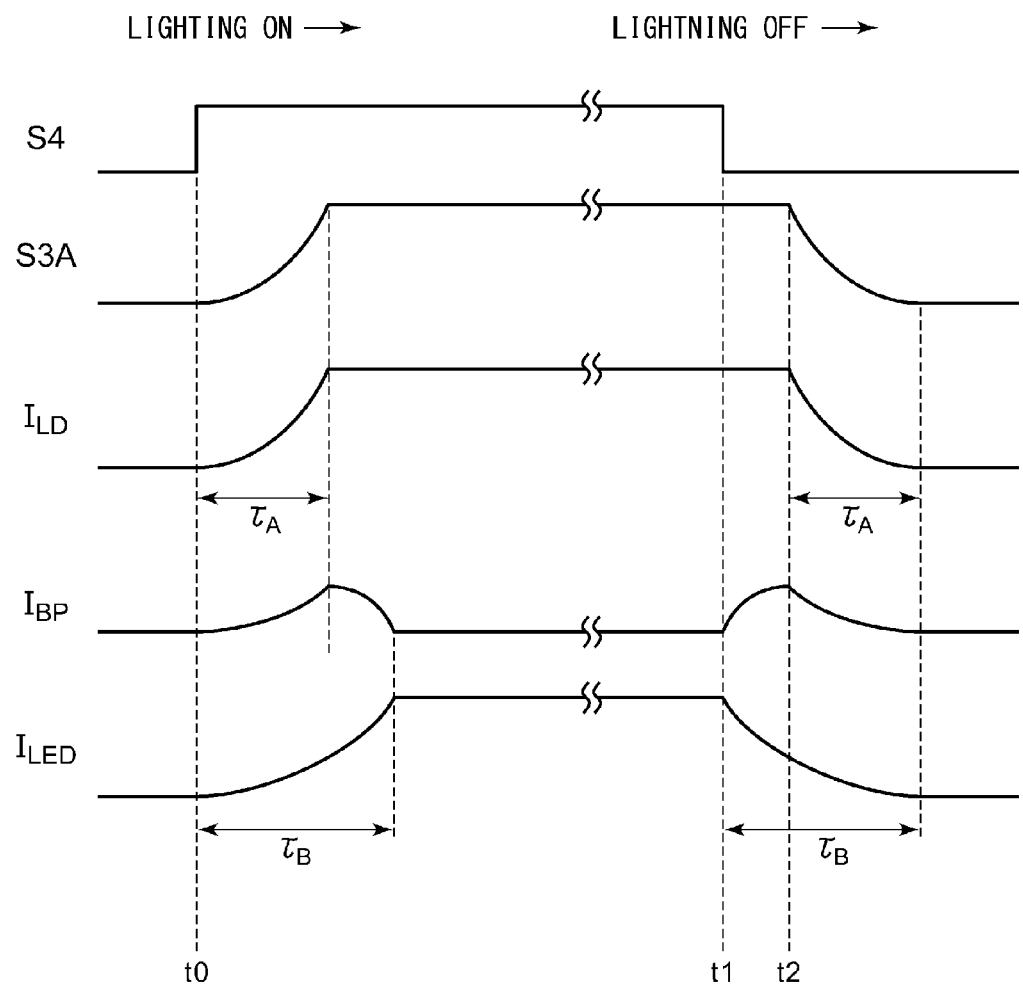
FIG. 5 is an operation waveform diagram showing the operation of the lighting circuit shown in FIG. 4.

FIG. 5 is an operation waveform diagram showing the operation of the lighting circuit 300a shown in FIG. 4. When the lighting on/off instruction signal S4 becomes the lighting on level at the time point t0, the gradual change controller 304 changes the dimming signal S3A with the first gradual change time period $\tau_A$, which gradually increases the driving current $I_{LD}$. As a result, the luminance of the first light source 202A rises with the first gradual change time period $\tau_A$.

On the other hand, a current $I_{LD}$ that flows through the second light source 202B is proportional to the difference between the current $I_{LD}$ supplied to the first light source 202A and the current $I_{BP}$ that flows through the bypass switch 310.

$$I_{LED} = I_{LD} - I_{BP}$$

In other words, by controlling the waveform of the current $I_{BP}$ so as to obtain a desired gradual change profile of the driving current $I_{LED}$, such an arrangement is capable of gradually turning on the second light source 202B with a desired gradual change time period $\tau_B$ independently of the waveform of the dimming signal S3A.

By providing a control operation that is the reverse of the lighting on control operation, such an arrangement provides a gradual change in turning off the lighting. When the lighting on/off instruction signal S4 transits to the lighting off level at the time point t2, the gradual change controller 304 raises the current $I_{LD}$ that flows through the bypass switch 310. As a result, first, the current $I_{LED}$ supplied to the second light source 202B starts to decrease. Furthermore, at the time point t2, the output current $I_{LD}$ of the driving circuit 302 starts to decrease with the first gradual change time period $\tau_A$ based on the dimming signal S3A. The current $I_{BP}$ that flows through the bypass switch 310 is generated such that the current $I_{LED}$ to be supplied to the second light source 202B decreases with a desired profile.

As described above, with the lighting circuit 300a shown in FIG. 4, such an arrangement allows the two light sources 202A and 202B to be turned on with different gradual change periods $\tau_A$ and $\tau_B$ by means of a common driving circuit. This allows the cost to be reduced as compared with an arrangement including a pair of driving circuits. It should be noted that the waveform in FIG. 5 is shown for exemplary purposes only. That is to say, a desired waveform may be designed.

Figure 6:
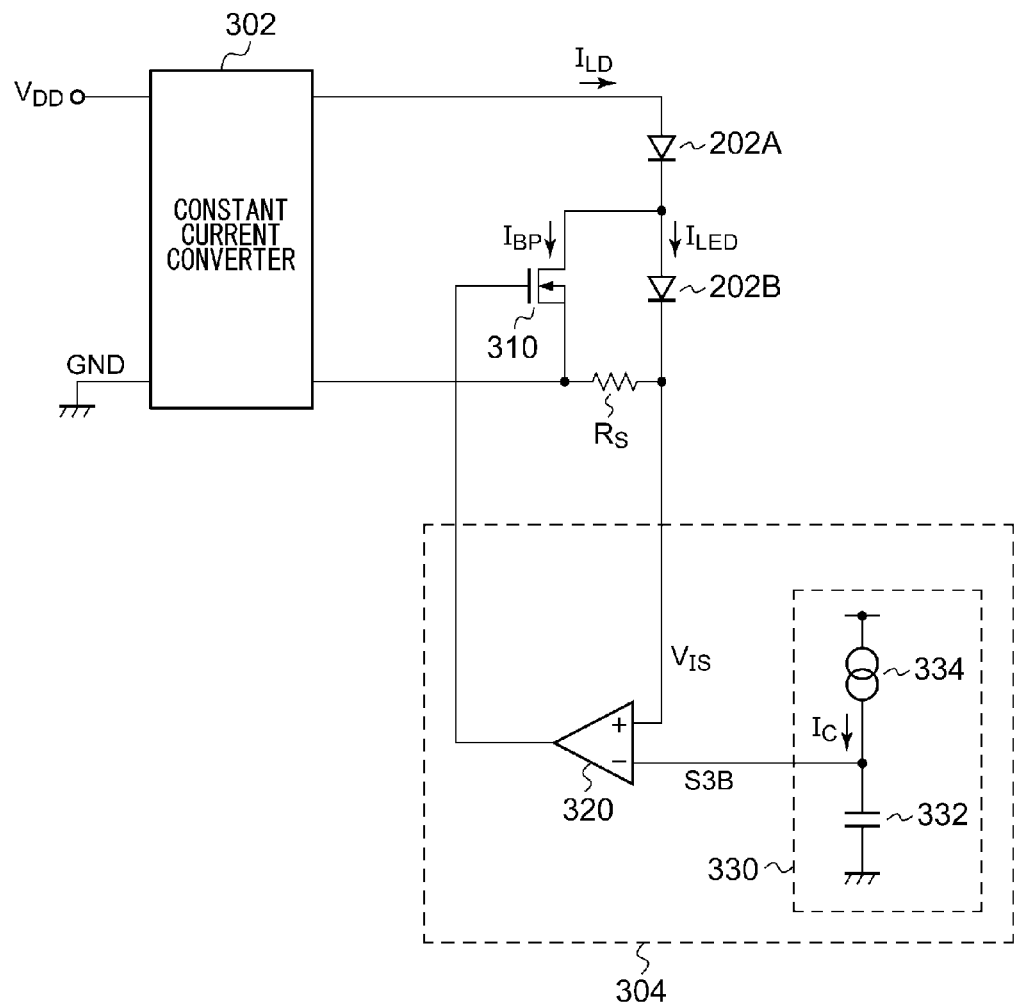
FIG. 6 is a circuit diagram showing a specific example configuration of a gradually-change controller shown in FIG. 4.

FIG. 6 is a circuit diagram showing a specific example configuration of the gradual change controller 304 shown in FIG. 4. The bypass switch 310 is a transistor. Here, the bypass switch 310 is configured as an N-channel MOSFET. Also, an NPN bipolar transistor may be employed. Alternatively, a P-channel MOSFET or a PNP bipolar transistor may be employed.

A signal generating unit 330 generates a gradual change signal S3B for representing the waveform to be provided by the second light source 202B. It can also be said that the gradual change signal S3B corresponds to S3B shown in FIG. 4. The signal generating unit 330 may be configured as a capacitor 332 and a current source 334, for example. The current source 334 is configured such that, when the lighting is gradually turned on, the current $I_C$ is supplied to the capacitor 332 so as to charge the capacitor 332, and such that, when the lighting is gradually turned off, the capacitor 332 is discharged. The voltage across the capacitor 332 is used as the gradual change signal S3B.

In a case of design giving consideration to the sensitivity of human eyes, when the lighting is gradually turned on, as shown in FIG. 5, the slope of the driving current $I_{LED}$ is preferably designed such that it becomes larger with the passage of time. In this case, the current source 334 may preferably be configured to change the charging current $I_C$ according to the voltage across the capacitor 332.

The signal generating unit 330 may be configured as a combination of a processor that generates digital waveform data and a D/A converter that converts the waveform data into an analog gradual change signal S3B.

An error amplifier 320 amplifies the difference between the gradual change signal S3B and a current detection signal $V_{IS}$ that indicates the driving current $I_{LED}$ that flows through the second light source 202B, and outputs the difference signal thus amplified to a control terminal (gate) of the transistor 310. The generating method for the current detection signal $V_{IS}$ is not restricted in particular. For example, a sensing resistor $R_S$ may be arranged on a path of the driving current $I_{LED}$, and a voltage drop across the sensing resistor $R_S$ may be used.

With the gradual change controller 304 shown in FIG. 6, such an arrangement is capable of feedback controlling the on resistance (i.e., the amount of current $I_{BP}$) of the transistor 310 such that the current waveform of the driving current $I_{LED}$ matches the waveform of the gradual change signal S3B.

With the gradual change controller 304 shown in FIG. 6, the bypass switch 310 is feedback controlled in a closed loop manner so as to obtain a desired waveform of the driving current $I_{LED}$. However, the present invention is not restricted to such an arrangement. Also, the bypass switch 310 may be controlled in an open loop manner.

Figure 7:
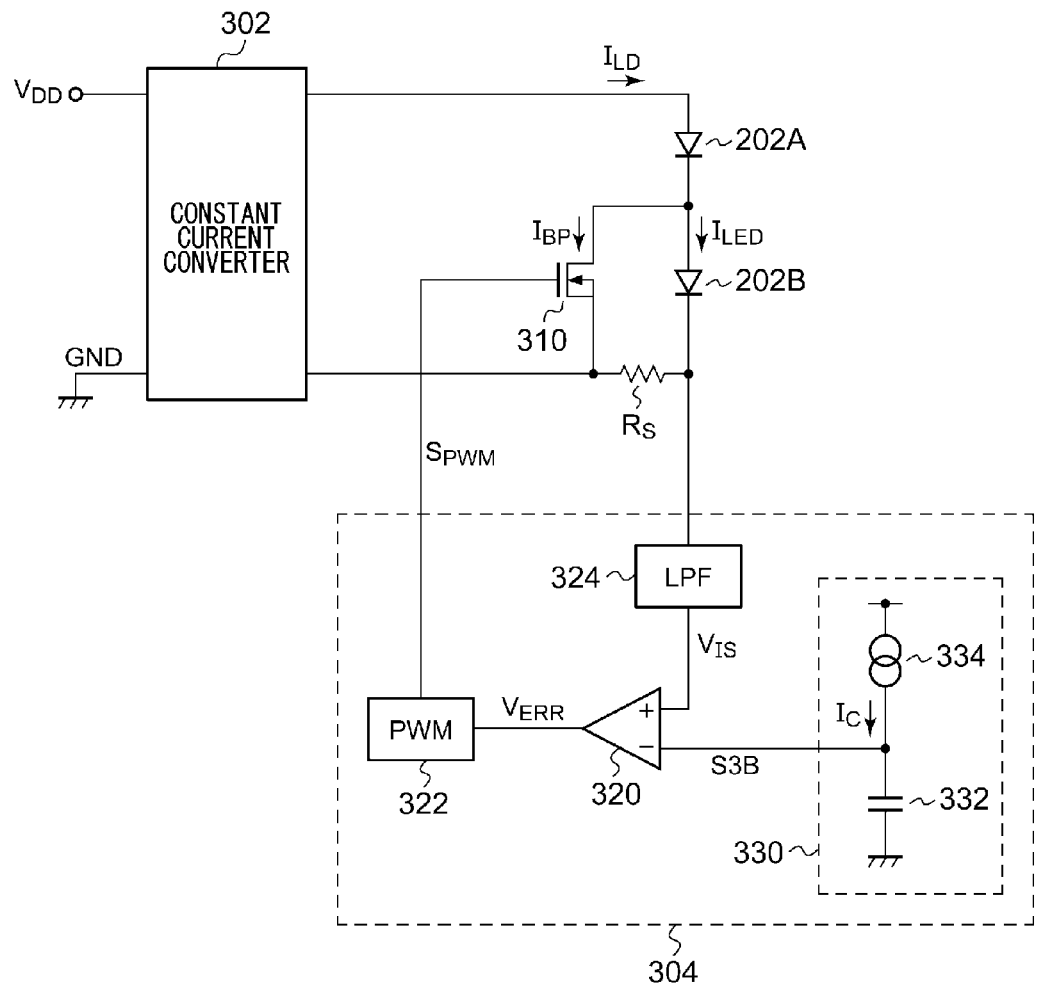
FIG. 7 is a circuit diagram showing an another example configuration of the gradually-change controller shown in FIG. 4.

FIG. 7 is a circuit diagram showing another example configuration of the gradual change controller 304 shown in FIG. 4. The gradual change controller 304 includes a pulse modulator 322. The pulse modulator 322 performs switching of the transistor 310 according to a gradual change signal S3b.

The current detection signal $V_{IS}$ may be a signal obtained by smoothing the voltage drop across the sensing resistor $R_S$ by means of a low-pass filter 324. In the example shown in FIG. 7, the pulse modulator 322 generates a pulse signal $S_{PWM}$ having a duty ratio that corresponds to an output $V_{ERR}$ of the error amplifier 320. The configuration of the pulse generator 322 is not restricted in particular. Known techniques may be employed. For example, by comparing the output $V_{ERR}$ of the error amplifier 320 with a triangle wave or a sawtooth wave, such an arrangement is capable of generating the pulse signal $S_{PWM}$.

With the gradual change controller 304 shown in FIG. 7, this allows the duty ratio of the switching of the transistor 310 to be feedback controlled such that the time average waveform of the driving current $I_{LED}$ matches the waveform of the gradual change signal S3B.

By controlling the bypass switch 310 using the pulse modulation, the following additional advantages can be obtained. First, such an arrangement is capable of providing chromaticity matching of the illumination color between a steady lighting state and a dimming state.

When the supplied current is equal to or lower than a threshold current, a laser diode is not able to perform laser oscillation. Accordingly, in a case of controlling the LED and the laser diode at the same timing according to a common gradual change signal that rises from zero, this leads to a problem of a delay in the lighting on timing of the laser diode. By performing a control operation using the pulse modulation, such an arrangement is capable of providing lighting on timing matching between the LED and the laser diode.

It should be noted that, in a case of performing PWM control of the bypass switch 310, the pulse signal $S_{PWM}$ may be generated in an open loop manner. Also, other modulation methods such as pulse density modulation, pulse frequency modulation, or the like may be employed instead of the PWM modulation.

Second Example Configuration

Figure 8:
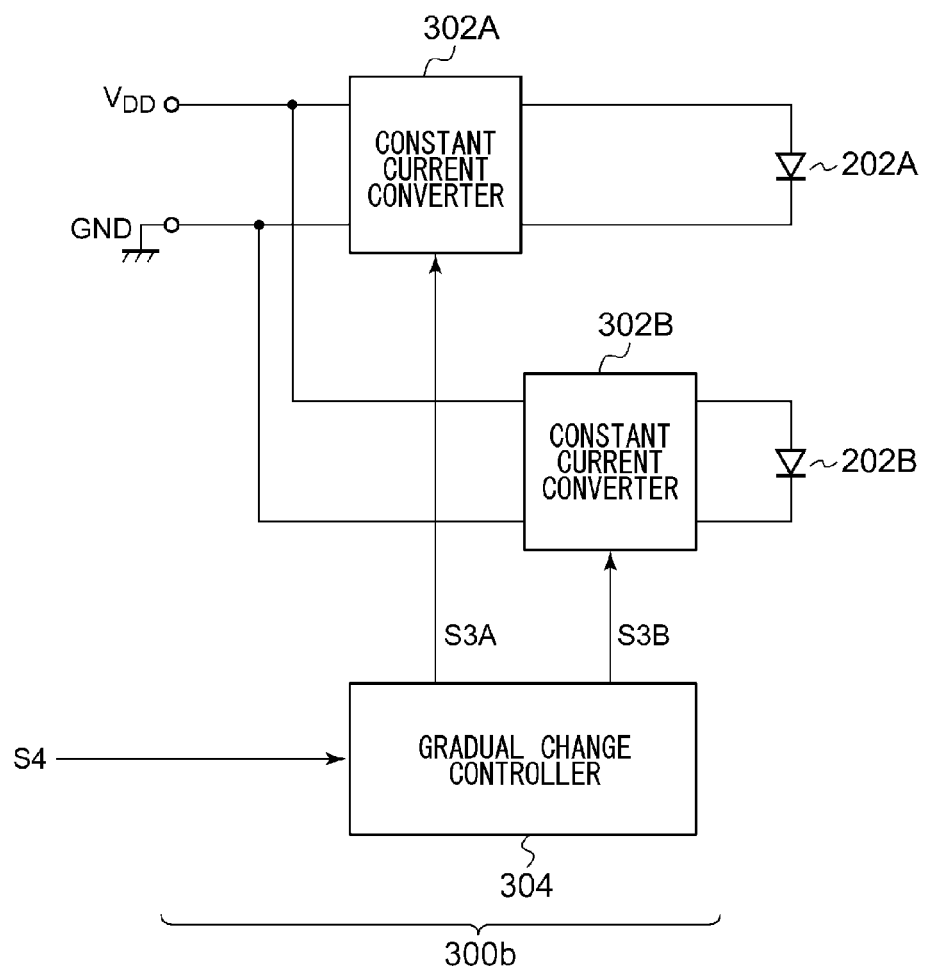
FIG. 8 is a block diagram showing a lighting circuit according to a second example configuration.

FIG. 8 is a block diagram showing a lighting circuit 300b according to a second example configuration. The lighting circuit 300b includes individual driving circuits 302A and 302B for the first light source 202A and the second light source 202B, respectively. Such a configuration requires a pair of driving circuits 302, i.e., involves a larger circuit scale than the lighting circuit 300a shown in FIG. 4. However, such a configuration allows the waveforms for gradually turning on and gradually turning off the first light source 202A and the second light source 202B to be individually designed as desired. Also, in a case in which there is a difference in the rated current between the first light source 202A and the second light source 202B, such a configuration can be effectively employed.

Second Embodiment

Figure 9:
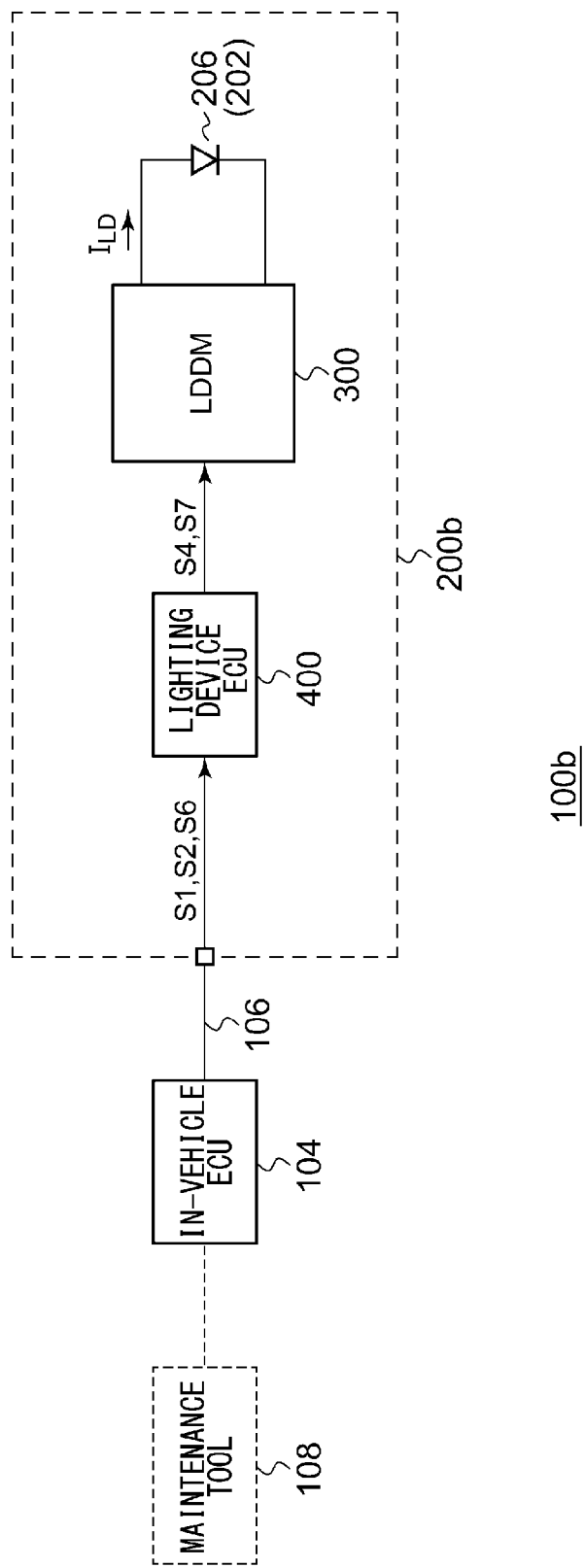
FIG. 9 is a block diagram showing a lighting device system including a vehicular lighting device according to a second embodiment.

FIG. 9 is a block diagram showing a lighting device system 100b including a vehicular lighting device 200b according to a second embodiment. The vehicular lighting device 200b includes a light source 202 including a laser diode 206 and a lighting circuit 300 that supplies the driving current $I_{LD}$ to the laser diode 206. As a stage upstream from the lighting circuit 300, a lighting device ECU 400 is provided. The lighting circuit 300 is also referred to as the "LDDM (laser diode driver module)."

For example, the lighting device system 100b is configured as the first light source 202A that supports the additional high beam described in the first embodiment and a circuit that relates to a lighting circuit thereof.

The lighting circuit 300 is configured to be switchable between a normal mode in which the driving current $I_{LD}$ that is higher than an oscillation threshold value $I_{TH}$ is supplied to the laser diode 206, and a test mode (which will also be referred to as the "maintenance mode" or "diagnostic mode") in which the driving current $I_{LD}$ that is lower than the oscillation threshold value $I_{TH}$ is steadily supplied to the laser diode 206.

As shown in FIG. 2 or the like, the lighting device ECU 400 includes a CPU 402. The CPU 402 is set to the test mode according to control received via the bus 106. For example, the vehicular ECU 104 outputs a mode control signal S6 in addition to the lighting instruction S1 and the driving information S2. The mode control signal S6 is data that provides an instruction for selection of one from among the normal mode and the test mode. When the mode control signal S6 indicates the normal mode, the lighting device ECU 400 controls the laser diode 206 to emit light in an oscillation state. When the mode control signal S6 indicates the test mode, the lighting device ECU 400 controls the laser diode 206 to emit light in a non-oscillation state.

In addition to the lighting on/off instruction signal S4, current control data S7 which indicates the amount of driving current may be output from the lighting device ECU 400 to the lighting circuit 300. When the lighting on/off instruction signal S4 becomes the lighting on level, the lighting circuit 300 generates the driving current $I_{LD}$ with an amount of current that corresponds to the current control data S7.

The above is the basic configuration of the lighting device system 100b. Next, description will be made regarding the operation thereof.

During maintenance, the vehicle is stationary, and it can be assumed that there are workers around the vehicle. In this state, in a case in which the laser diode 206 emits light in the same way as when the vehicle is driven, this disturbs the workers in the vicinity of the lighting device.

With the lighting device system 100b shown in FIG. 9, during maintenance of the vehicle, a maintenance tool 108 is coupled to the vehicular ECU 104 as indicated by the broken line in FIG. 9. This instructs the vehicular ECU 104 to transmit the mode control signal S6 that is an instruction to set the test mode to the lighting device ECU 400.

In this case, the laser diode 206 operates in a non-oscillation state, and accordingly, the laser diode 206 emits only a weak light. This prevents the workers from being subjected to disturbance even if they are in the vicinity of the vehicle. Also, such an arrangement allows the optical axis alignment or the like to be performed for the laser diode 206 using such a weak light.

In particular, in a case in which the high-beam light source 202 is configured as follows, the lighting device system 100b provides marked advantages.

Figure 10:
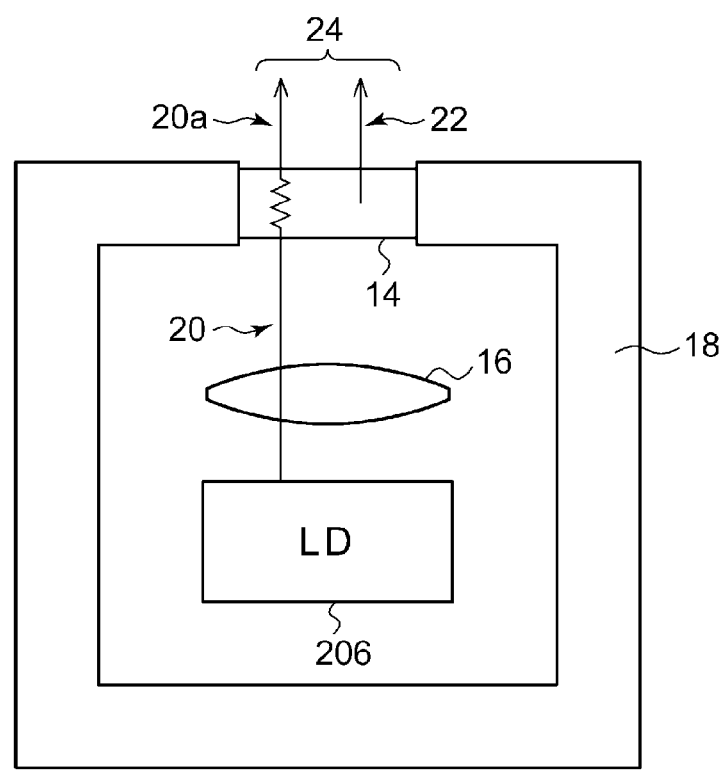
FIG. 10 is a cross-sectional view of a high-beam light source including a laser diode.

FIG. 10 is a cross-sectional view of the high-beam light source 202 including the laser diode 206. The light source 202 mainly includes the laser diode 206, a fluorescent member 14, an optical system 16, and a housing 18.

The laser diode 206 shown in FIG. 10 generates blue excitation light 20. The excitation light 20 is focused on the fluorescent member 14 by means of the optical system 16. The optical system 16 is configured as a lens, reflecting mirror, optical fiber, or a combination thereof. Upon reception of the blue excitation light 20, the fluorescent member 14 generates fluorescent light 22 having a spectrum distribution over a wavelength region including wavelengths (green to red) that are longer than the excitation light 20. The excitation light 20 emitted to the fluorescent member 14 is scattered by the fluorescent member 14. As a result, after the excitation light 20 passes through the fluorescent member 14, the excitation light 20 has only negligible coherence. The fluorescent member 14 is fitted to and held by an opening formed in the housing 18, for example. The output light 24 of the light source 202 includes green to red fluorescent light 22 emitted from the fluorescent member 14, and the blue excitation light 20a remaining after it passes through the fluorescent member 14. As a result, the output light 24 has a spectrum distribution of white light.

With such a high-beam light source 202, if an abnormal state (which will be referred to as the "fluorescent member abnormal state" hereafter) has occurred, e.g., if there is a crack in the fluorescent member 14 or if the fluorescent member 14 has fallen away from the housing 18, the excitation light 20 generated by the laser diode 206 is directly output with strong coherence without being scattered by the fluorescent member 14, and is emitted to the area forward of the vehicle.

By operating the vehicular lighting device 200b including the high-beam light source 202 shown in FIG. 10 in the test mode during maintenance, the output light becomes very weak. Accordingly, such an arrangement provides improved safety even if a situation has occurred in which the output light of the laser diode 206 is directly emitted without being scattered.

Also, after the maintenance tool 108 is inserted such that it is arranged between the lighting device ECU 400 and the vehicular ECU 104, the mode control signal S6, which is an instruction to set the test mode, may be directly input from the maintenance tool 108 to the lighting device ECU 400.

Third Embodiment

Figure 11:
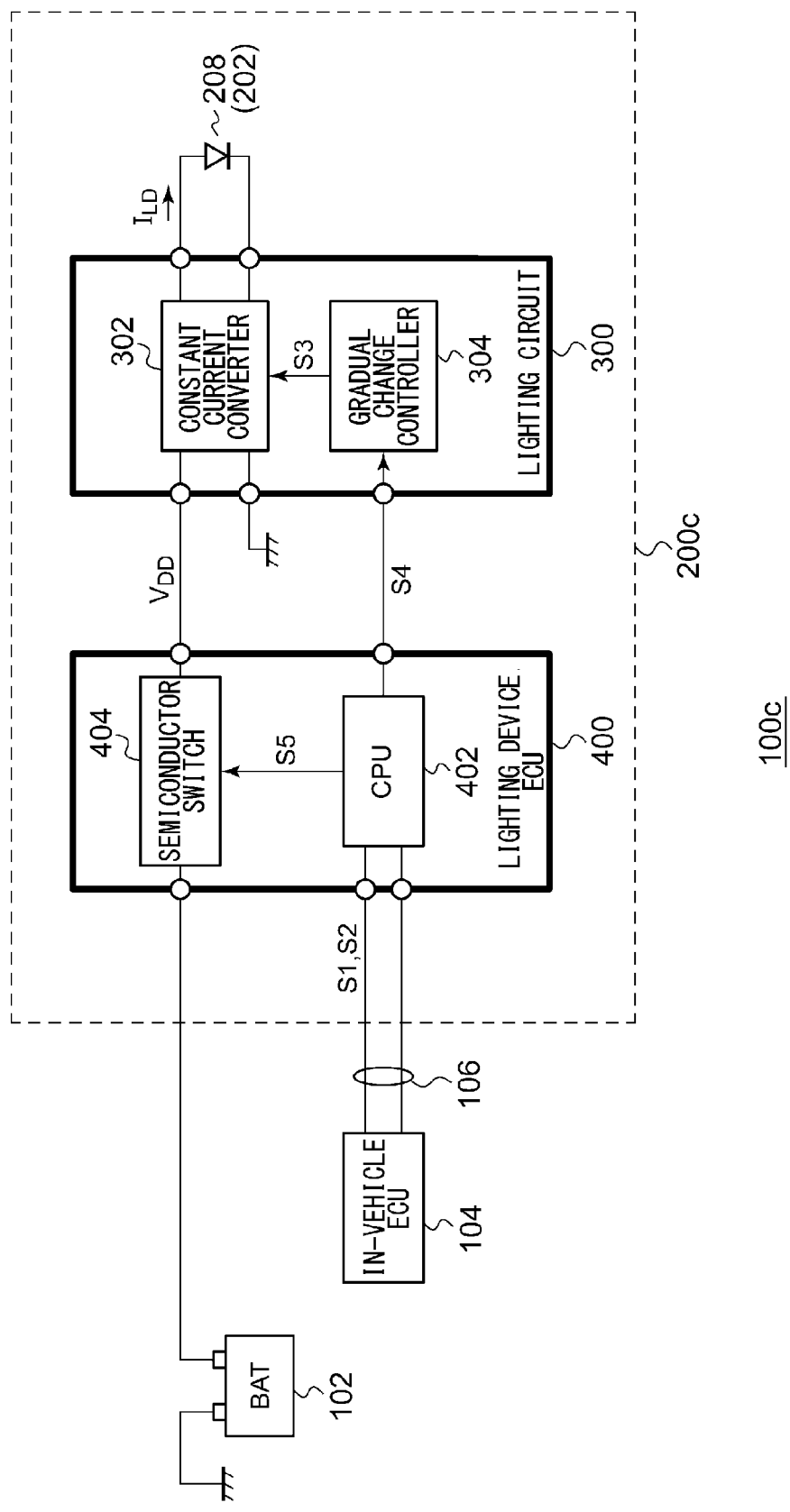
FIG. 11 is a block diagram showing a lighting device system according to a third embodiment.

FIG. 11 is a block diagram showing a lighting device system 100c according to a third embodiment.

The lighting device system 100c includes a battery 102, a vehicular ECU 104, a CAN bus 106, and a vehicular lighting device 200c. Each block has the same functions as those described in the first and second embodiments.

The vehicular lighting device 200c includes a semiconductor light source 208 configured as the high-beam light source 202. Examples of the semiconductor light source 208 include laser diodes, light-emitting diodes, organic EL, and the like. Description will be made in the present embodiment regarding an arrangement in which the semiconductor light source 208 is configured as a laser diode. Also, the high-beam light source 202 may be an additional high-beam light source which is provided in addition to an ordinary high-beam light source.

The lighting circuit 300 includes a driving circuit 302 and a gradual change controller 304. The driving circuit 302 supplies the driving current $I_{LD}$ that corresponds to the dimming signal S3 to the high-beam light source 202. As the driving circuit 302, a constant current converter is preferably employed, configured to step up or otherwise step down the power supply voltage $V_{DD}$ and to supply the power supply voltage thus stepped up or down to the high-beam light source 202, and to stabilize the driving current $I_{LED}$ that flows through the high-beam light source 202 to a target current that corresponds to the dimming signal S3. It should be noted that the topology of the constant current converter is not restricted in particular. The driving circuit 302 may employ both an analog dimming operation in which the amount of the driving current $I_{LD}$ is adjusted and a PWM (pulse width modulation) dimming operation in which high-speed switching is performed for the driving current $I_{LD}$ so as to adjust the duty ratio thereof. Also, the driving circuit 302 may employ only one from among the analog dimming operation and the PWM dimming operation.

The gradual change controller 304 generates the dimming signal S3 that gradually changes with time according to the lighting on/off instruction signal S4 received from the lighting device ECU 400. Specifically, when the lighting on/off instruction signal S4 transits to the lighting on level (e.g., high level), the gradual change controller 304 gradually changes (gradually raises, for example) the dimming signal S3 with time so as to increase the driving current $I_{LD}$. Conversely, when the lighting on/off instruction signal S4 transits to the lighting off level (e.g., low level), the gradual change controller 304 gradually changes (gradually lowers, for example) the dimming signal S3 with time so as to reduce the driving current $I_{LD}$. In a second mode described later, the time (gradual change time period) τ required for the dimming signal S3 to transit is preferably designed in a range between 0.2 and 5 seconds.

Human eyes have logarithmical sensitivity characteristics with respect to the surrounding brightness. Accordingly, as the surrounding brightness level becomes lower, the sensitivity of human eyes becomes higher. In the case of gradually raising the luminance of a lamp (gradually turning on), during a range in which the luminance of the lamp is low, the luminance is raised with a low rate of change. Subsequently, the rate of change in luminance is raised according to an increase in the luminance of the lamp. With such an arrangement, the lamp can be turned on in a manner that is natural for human eyes. Similarly, in a case of gradually lowering the luminance of the lamp (gradually turning off), during a range in which the luminance of the lamp is high, the luminance is lowered with a high rate of change. Subsequently, the rate of change in luminance is lowered according to a reduction in the luminance of the lamp.

The configuration of the gradual change controller 304 is not restricted in particular. In a case in which the driving circuit 302 receives a voltage signal as the dimming signal S3, the gradual change controller 304 may include a capacitor and a charging/discharging circuit that charges or otherwise discharges the capacitor. With such an arrangement, the voltage across the capacitor may be employed as the dimming signal S3.

The lighting device ECU 400 includes a CPU (central processing unit) 402 and a semiconductor switch 404. The CPU 402 generates the lighting on/off instruction signal S4 that is an instruction to turn on and off the high-beam light source 202 according to the lighting instruction S1 and the driving information S2 received from the vehicular ECU 104.

For example, the driving information S2 includes the presence or absence of a forward vehicle (S2a), the vehicle speed (S2b), and the steering angle (S2c). When the lighting instruction S1 is an instruction to turn on the lamp, and when the presence or absence of a forward vehicle, the vehicle speed, and the steering angle satisfy predetermined conditions, the lighting device ECU 400 sets the lighting on/off instruction signal S4 to the lighting on level.

As an example, when the lighting on/off instruction signal S4 is an instruction to turn on the lamp, and when the conditions (i) no forward vehicle is detected, (ii) the vehicle speed is equal to or higher than a predetermined value (80 km/h), and (iii) the steering angle is equal to or lower than a predetermined value (e.g., 5 degrees) are satisfied, the lighting on/off instruction signal S4 is set to the lighting on level.

Furthermore, when the lighting on/off instruction signal S4 is set to the lighting on level, and when at least one condition is satisfied from among (i) a forward vehicle is detected, (ii) the vehicle speed is equal to or lower than a predetermined value (60 km/h), and (iii) the steering angle is equal to or higher than a predetermined value (e.g., 10 degrees), the lighting on/off instruction signal S4 is set to the lighting off level.

The semiconductor switch 404 is arranged on a power supply path via which power is supplied from the battery 102 to a driving circuit 302. The on/off operation of the semiconductor switch 404 is controlled according to a control signal S5 received from the processor 402. In the lighting on state of the high-beam light source 202, the semiconductor switch 404 is turned on.

With a lighting device employing a high-luminance laser diode or the like as the semiconductor light source 208, there is a demand for a failsafe function for suppressing risk around it to a minimum.

Relating to such a failsafe function, description will be made regarding the configuration of the driving circuit 302.

Figure 12:
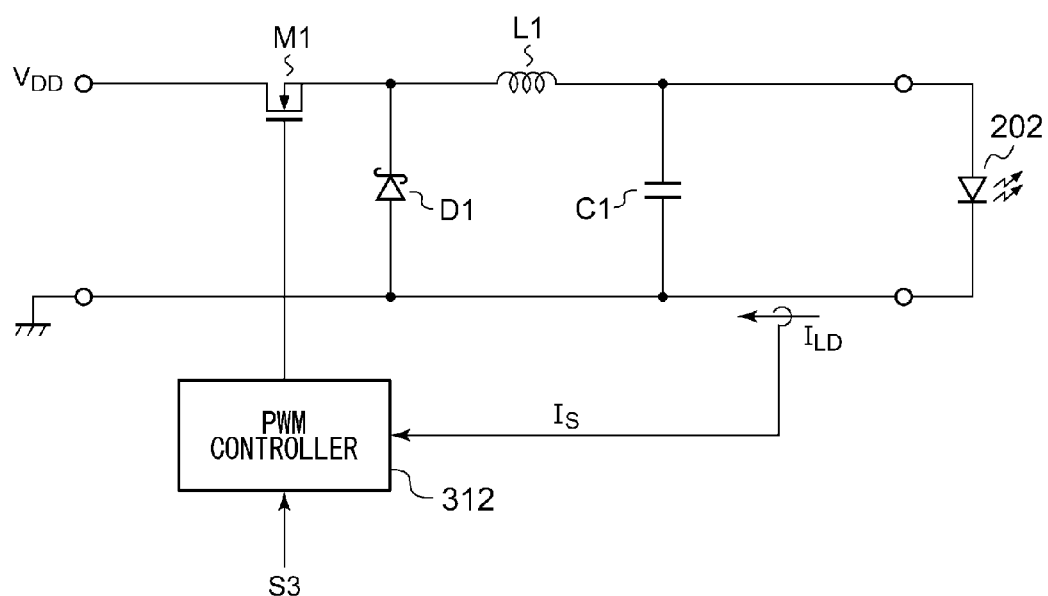
FIG. 12 is a circuit diagram showing a constant current converter configured as a driving circuit.

FIG. 12 is a circuit diagram showing a constant current converter that functions as the driving circuit 302. The constant current converter is a buck converter including a switching transistor M1, a rectifier element D1, an inductor L1, and a capacitor C1. A converter controller 312 performs switching of the switching transistor M1 such that a detection signal $I_S$ of the driving current $I_{LD}$ matches a predetermined target value. The converter controller 312 feedback controls the duty ratio of the switching transistor M1 using a PWM method or bang-bang method (hysteresis control). It should be noted that the topology of the converter is being described for exemplary purposes only. Also, other known configurations may be employed.

Description will be made regarding a case in which a short-circuit fault has occurred in the switching transistor M1 in such a converter. In this case, the driving current $I_{LD}$ to be supplied to the high-beam light source 202 cannot be controlled. In some cases, a large amount of current flows through the high-beam light source 202, leading to undesired illumination by the beam. Also, this leads to the potential to involve adverse effects on the high-beam light source 202 or other circuit elements.

The vehicular lighting device 200 is preferably designed giving consideration to a failsafe function for handling such a fault. From this viewpoint, the CPU 402 controls the semiconductor switch 404 as follows.

When the semiconductor light source 208 is to be gradually turned off, the CPU 402 turns off the switch after a predetermined time period $T_{OFF}$ elapses after the CPU 402 sets the lighting on/off instruction signal S4 to the lighting off level. The predetermined time period $T_{OFF}$ is designed to be substantially equal to or to be slightly longer than the gradual change time period τ of the dimming signal S3.

Figure 13:
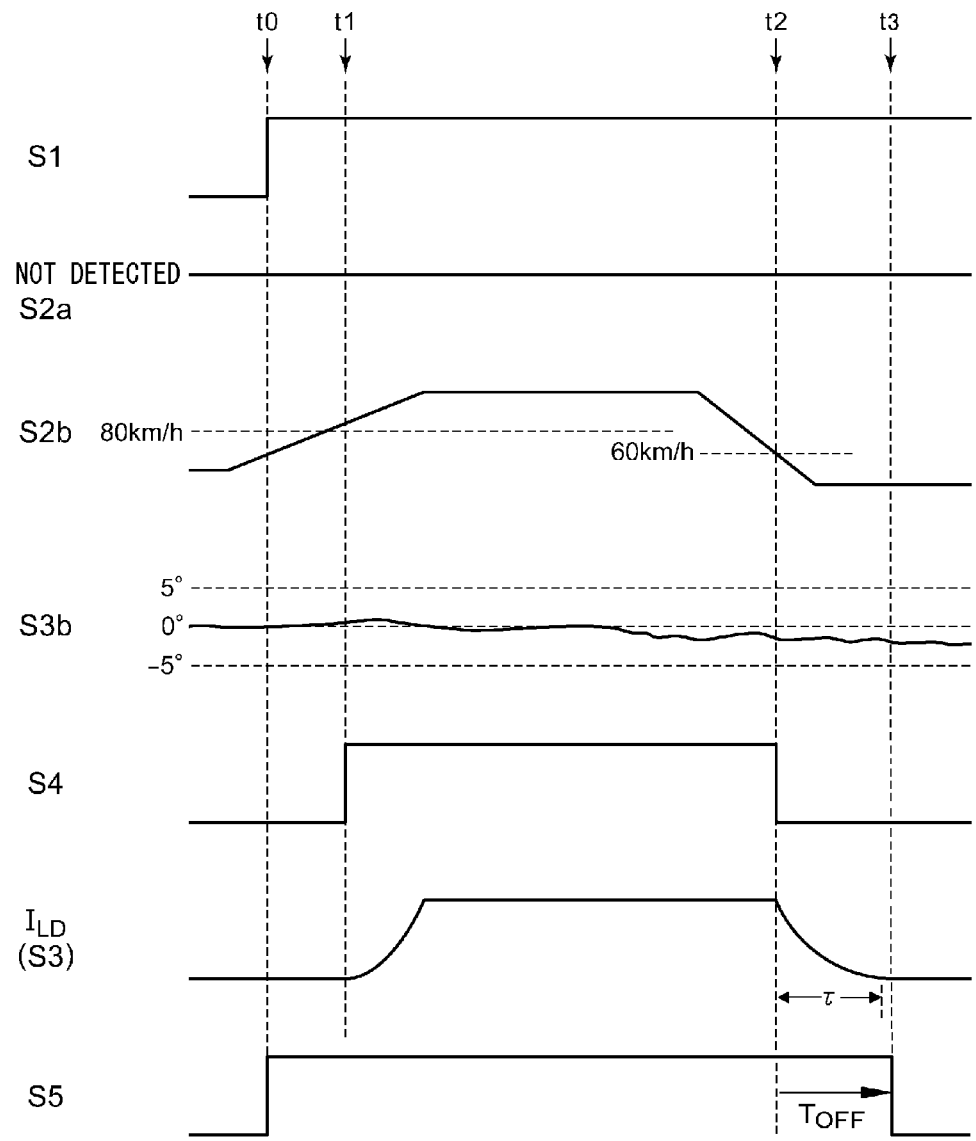
FIG. 13 is a first operation waveform diagram showing the operation of the vehicular lighting device shown in FIG. 11.

FIG. 13 is a first operation waveform diagram showing the operation of the vehicular lighting device 200c shown in FIG. 11. At the time point t0, the lighting instruction S1 transits to the lighting on level. The lighting instruction S1 may be configured as a common instruction shared by an instruction to turn on the ordinary high-beam lamp. Also, the lighting instruction S1 may be input via a manual control operation of the driver. Also, the lighting instruction S1 may be configured as an automatic high-beam control instruction automatically provided by the vehicle in order to control the lighting on/off of the lamp.

In response to a transition of the lighting instruction S1, the CPU 402 sets a control signal S5 to the high level so as to turn on the semiconductor switch 404.

In this stage, the vehicle speed indicated by the driving information S2b is lower than a threshold value (80 km/h), and accordingly, the lighting on/off instruction signal S4 is set to the low level. When the vehicle speed indicated by the driving information S2b exceeds the threshold value (80 km/h) at the time point t1, the lighting on/off instruction signal S4 is switched to the high level. The gradual change controller 304 raises the dimming signal S3 with time, according to the lighting on/off instruction signal S4 set to the high level. As a result, the driving circuit 302 raises the driving current $I_{LD}$ with time, thereby gradually turning on the high-beam light source 202.

At the time point t2, the vehicle speed is reduced and becomes lower than 60 km/h. The CPU 402 switches the lighting on/off instruction signal S4 to the lighting off level while maintaining the on state of the semiconductor switch 404. The gradual change controller 304 raises the dimming signal S3 with time according to the lighting on/off instruction signal S4 set to the lighting off level. As a result, the driving circuit 302 reduces the driving current $I_{LD}$ with time, thereby gradually turning off the high-beam light source 202. Subsequently, at the time point t3 after a predetermined time period $T_{OFF}$ elapses from the time point t2, the CPU 402 turns off the semiconductor switch 404.

It should be noted that the timing at which the semiconductor switch 404 is to be turned on is not restricted in particular. In the example shown in FIG. 13, the control signal S5 is set to the high level at the same time as the transition of the lighting instruction to the high level. Also, the control signal S5 may be set to the high level at the same time as or otherwise immediately before the lighting on/off instruction signal S4 is switched to the lighting on level. Alternatively, the semiconductor switch 404 may be turned on before the transition of the lighting instruction S1 to the lighting on level.

The above is the operation of the vehicular lighting device 200. Next, description will be made regarding the advantages thereof.

As a comparison technique, let us consider a control operation in which the semiconductor switch 404 is fixed to the normally on state regardless of whether the high-beam light source 202 is set to the lighting on state or the lighting off state. With such a control operation, in a case in which a short-circuit fault has occurred in the switching transistor M1, the high-beam light source 202 emits light even when the lighting instruction S1 or otherwise the lighting on/off instruction signal S4 is set to the lighting off level.

Furthermore, in such a comparison technique, let us consider an arrangement configured to detect a fault in the switching transistor M1, and that is provided with a protection function of switching off the lighting on/off instruction signal S4 so as to control the high-beam light source 202 to turn off when there is such a fault. Even with such an arrangement, in a case in which a short circuit-fault has occurred in the switching transistor M1, when the power supply voltage $V_{DD}$ is supplied to the driving circuit 302, the power is supplied to the high-beam light source 202, which is a problem.

Furthermore, in some cases, the high-beam light source 202 may be configured as a combination of a blue light laser diode and a fluorescent member that can be excited by the laser diode as shown in FIG. 10. If an abnormal state of the fluorescent member has occurred, the output light of the laser diode is directly emitted without being scattered by the fluorescent member, which becomes a problem. With such a comparison technique, a problem remains even in a case in which a protection function is provided for turning off the high-beam light source 202 upon detecting an abnormal state of the fluorescent light source. That is to say, in a case in which a short-circuit fault has occurred in the switching transistor M1, when the power supply voltage $V_{DD}$ is supplied to the driving circuit 302, the power is supplied to the high-beam light source 202, which is a problem.

In contrast, with the vehicular lighting device 200 according to the third embodiment, the semiconductor switch 404 is turned on during only a minimum necessary period. After transmitting an instruction to turn off the high-beam light source 202, such an arrangement turns off the semiconductor switch 404, thereby allowing the power supply to the high-beam light source 202 to be stopped in a sure manner. Thus, such an arrangement resolves the problems that can occur in the comparison techniques.

Figure 14:
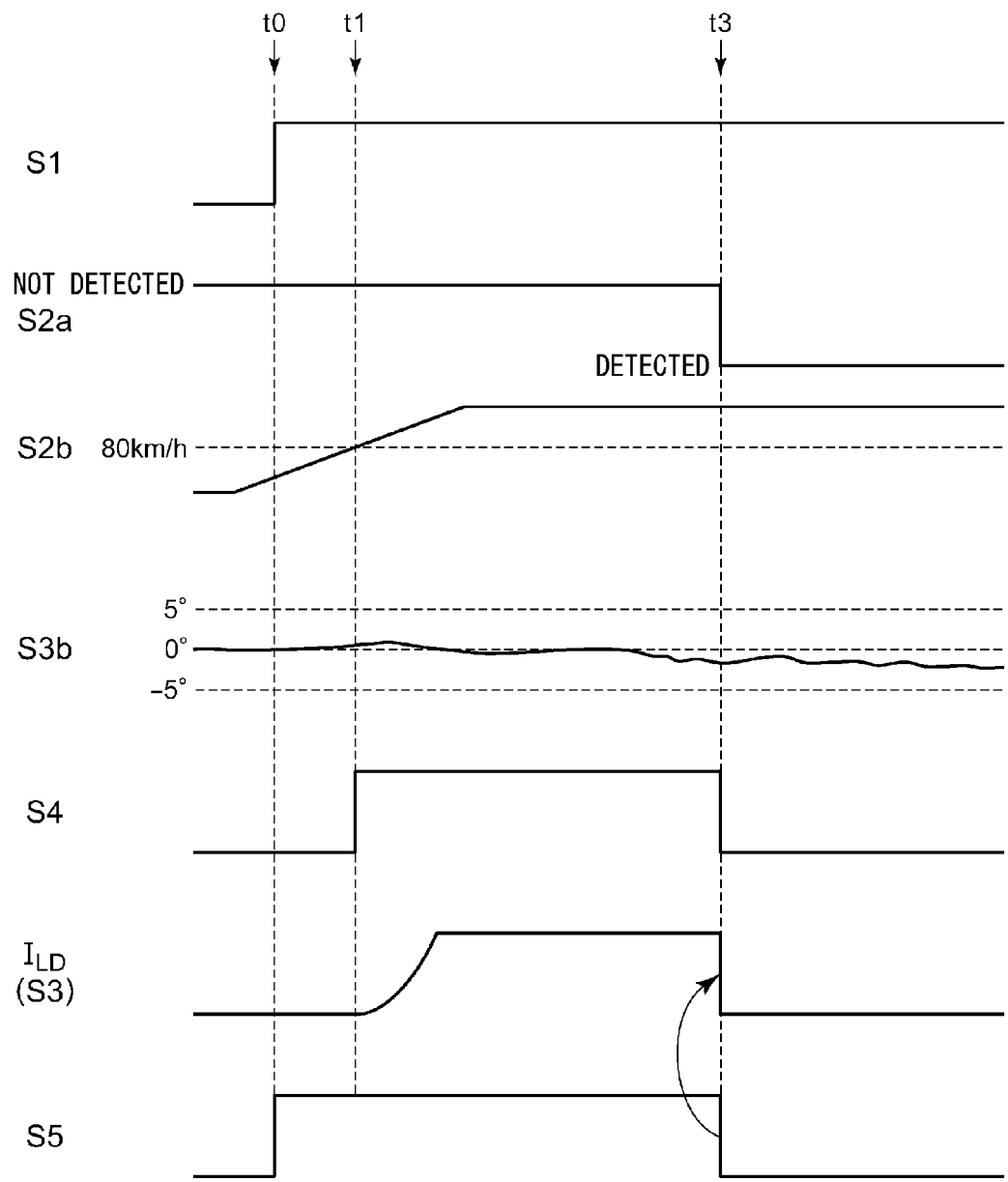
FIG. 14 is a second operation waveform diagram showing the operation of the vehicular lighting device shown in FIG. 11.

FIG. 14 is a second operation waveform diagram showing the operation of the vehicular lighting device 200c shown in FIG. 11. When the ordinary high-beam lamp is instructed to turn on at the time point t0, the CPU 402 sets the control signal S5 to the high level so as to turn on the semiconductor switch 404. At the time point t3, the driving information S2a indicates detection of a forward vehicle. In this case, the CPU 402 immediately switches the control signal S5 to the low level. This turns off the semiconductor switch 404, which stops the supply of the power supply voltage $V_{DD}$ to the driving circuit 302. As a result, the driving current $I_{LD}$ falls to zero in a short period of time, thereby turning off the vehicular lighting device. At the time point t3, the CPU 402 sets the lighting on/off instruction signal S4 to the lighting off level. However, after the supply of the power supply voltage $V_{DD}$ is stopped, the operation of the gradual change controller 304 for gradually turning off the lamp has no effect.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A vehicular lighting device comprising:
   a first light source structured to illuminate a first region;
   a second light source structured to provide a lower luminance than that of the first light source, and to illuminate a second region that overlaps the first region and has a larger area than that of the first region; and
   a lighting circuit structured to drive the first light source and the second light source according to a single lighting instruction which is common to the first light source and the second light source, and to gradually turn on the first light source and the second light source with different gradual change time periods in response to the lighting instruction, wherein a driving current supplied to the first light source and a driving current supplied to the second light source begin to change simultaneously.

2. The vehicular lighting device according to claim 1, wherein the gradual change time period set for the first light source is longer than the gradual change time period set for the second light source.

3. The vehicular lighting device according to claim 1, wherein the gradual change time period set for the second light source is longer than the gradual change time period set for the first light source.

4. The vehicular lighting device according to claim 1, wherein a difference in the gradual change time period between the first light source and the second light source is included in a range from 0.2 to 5 seconds.

5. The vehicular lighting device according to claim 1, wherein the first light source and the second light source are each a light source for providing an additional high beam,
wherein the first light source is structured as a laser diode, and
wherein the second light source is structured as a light-emitting diode.

6. The vehicular lighting device according to claim 1, wherein the first light source and the second light source are coupled in series,
wherein the lighting circuit comprises:
a driving circuit structured to supply a driving current that corresponds to a dimming signal to a series connection circuit of the first light source and the second light source;
a bypass switch arranged in parallel with one light source from among the first light source and the second light source set for a longer gradual change time period; and
a gradual change controller structured to generate the dimming signal that corresponds to gradually turning on/off the other light source set for a shorter gradual change time period, and to control a state of the bypass switch so as to gradually turn on/off the aforementioned one light source.

7. The vehicular lighting device according to claim 6, wherein the gradual change controller comprises:
a transistor structured as the bypass switch;
a signal generating unit structured to generate a gradual change signal that indicates a waveform for gradually turning on the other light source; and
an error amplifier structured to amplify a difference between a signal that indicates a driving current that flows through the other light source and the gradual change signal, and to output the difference thus amplified to a control terminal of the transistor.

8. The vehicular lighting device according to claim 6, wherein the gradual change controller comprises:
a transistor structured as the bypass switch;
a signal generating unit structured to generate a gradual change signal that indicates a waveform for gradually turning on the other light source; and
a pulse modulator structured to perform switching of the transistor according to the gradual change signal.

9. A vehicular lighting device comprising: a light source;
a driving circuit having its input coupled to receive a battery voltage via a power supply path from a battery, having its output coupled to the light source, and structured to supply, to the light source, a driving current that corresponds to a dimming signal;
a processor structured to generate a lighting on/off instruction signal that instructs the light source to turn on and off according to an instruction from a vehicle and driving information that indicates a driving situation;
a gradual change controller structured to generate the dimming signal that gradually changes with time in response to the lighting on/off instruction signal; and
a switch arranged on the power supply path, and structured such that an on/off state thereof is controlled by the processor,
wherein, when the light source is to be gradually turned off, the processor turns off the switch after a predetermined time period elapses after the lighting on/off instruction signal is set to the lighting off level.

10. The vehicular lighting device according to claim 9, wherein, when the light source is to be instantly turned off, the processor immediately turns off the switch.

11. The vehicular lighting device according to claim 9, wherein, when the lighting on/off instruction signal is to be set to a lighting on level, the processor turns on the switch at the same time as or otherwise before the setting of the lighting on/off instruction signal to the lighting on level.

* * * * *